US009161191B2

(12) United States Patent
Li et al.

(10) Patent No.: US 9,161,191 B2
(45) Date of Patent: Oct. 13, 2015

(54) NETWORK BASED MISSED CALL NOTIFICATION

(71) Applicant: Verizon Patent and Licensing Inc., Basking Ridge, NJ (US)

(72) Inventors: Mingxing S. Li, San Jose, CA (US); Priscilla Lau, Fremont, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 13/855,265

(22) Filed: Apr. 2, 2013

(65) Prior Publication Data

US 2014/0295807 A1     Oct. 2, 2014

(51) Int. Cl.
*H04W 4/16* (2009.01)
*H04M 3/42* (2006.01)
*H04W 4/00* (2009.01)

(52) U.S. Cl.
CPC ............ *H04W 4/16* (2013.01); *H04M 3/42195* (2013.01); *H04M 2203/1008* (2013.01); *H04W 4/00* (2013.01)

(58) Field of Classification Search
None
See application file for complete search history.

(56) References Cited

U.S. PATENT DOCUMENTS

| 8,548,433 | B1* | 10/2013 | Othmer et al. | 455/412.1 |
| 2009/0141875 | A1* | 6/2009 | Demmitt et al. | 379/88.14 |
| 2010/0086112 | A1* | 4/2010 | Jiang et al. | 379/93.23 |
| 2011/0287746 | A1* | 11/2011 | Gopinath et al. | 455/412.2 |
| 2012/0094642 | A1* | 4/2012 | Popperl et al. | 455/415 |

\* cited by examiner

*Primary Examiner* — Olumide T Ajibade Akonai
*Assistant Examiner* — Margaret G Mastrodonato

(57) ABSTRACT

A device is configured to detect that a user device has failed to receive a call attempt for a call intended for the user device and from a calling party, and determine, based on the detection, that the calling party has not left a voicemail message associated with the call. The device is configured to store missed call information, associated with the call, and send a first missed call notification to the user device, where the first missed call notification includes the missed call information. The device is configured to detect that the user device has not received the first missed call notification, and send a second missed call notification to the user device, where the second missed call notification includes the missed call information.

20 Claims, 7 Drawing Sheets

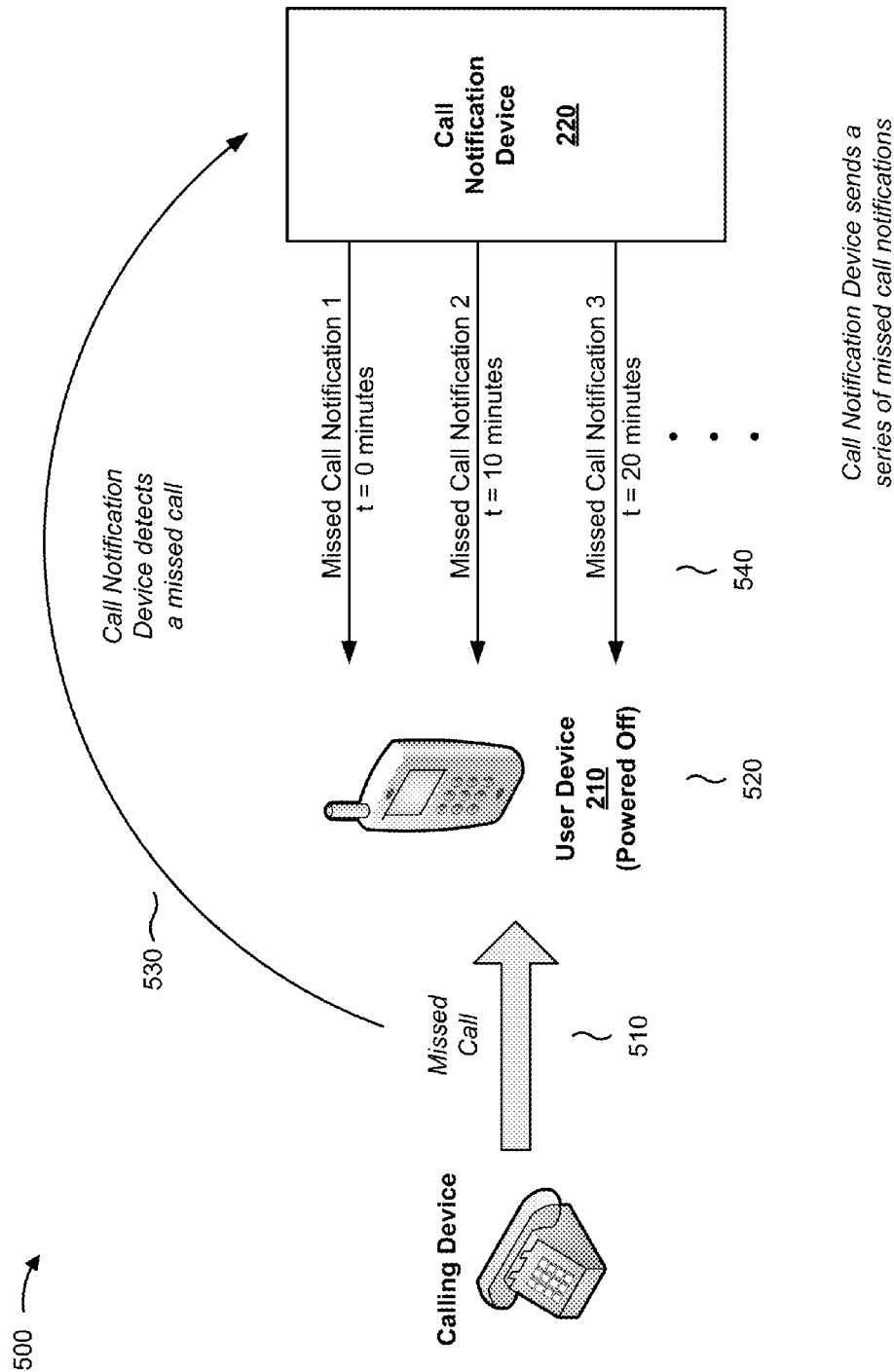

NETWORK BASED MISSED CALL NOTIFICATION

BACKGROUND

Communication devices, such as cellular phones, may receive calls from other communication devices via a communication network. A receiving communication device may fail to connect to a calling communication device when the receiving communication device is not connected to the communication network at the time of the call. For example, the receiving communication device may be powered off, malfunctioning, and/or outside of a network service area.

BRIEF DESCRIPTION OF THE DRAWINGS

FIGS. 5A and 5B are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A user device, such as a smartphone, may generate a missed call notification (e.g., a notification of an unanswered call from a calling device). The missed call notification may be displayed by the user device, such as via a notification icon displayed on the user device. However, when a calling device attempts to connect to the user device when the user device is disconnected from a network (e.g., the user device is powered off, the user device is malfunctioning, the user device is outside of a network service area, etc.), the user device may not detect the missed call, and may not generate a missed call notification of the unanswered call from the calling device. Implementations described herein may allow a user device to receive a missed call notification indicating that a calling device has attempted to connect to the user device while the user device was disconnected from the network. Although described in relation to voice calls, implementations described herein may apply to video calls, instant message (IM) exchanges, and/or other types of real-time communications.

Figure 1:
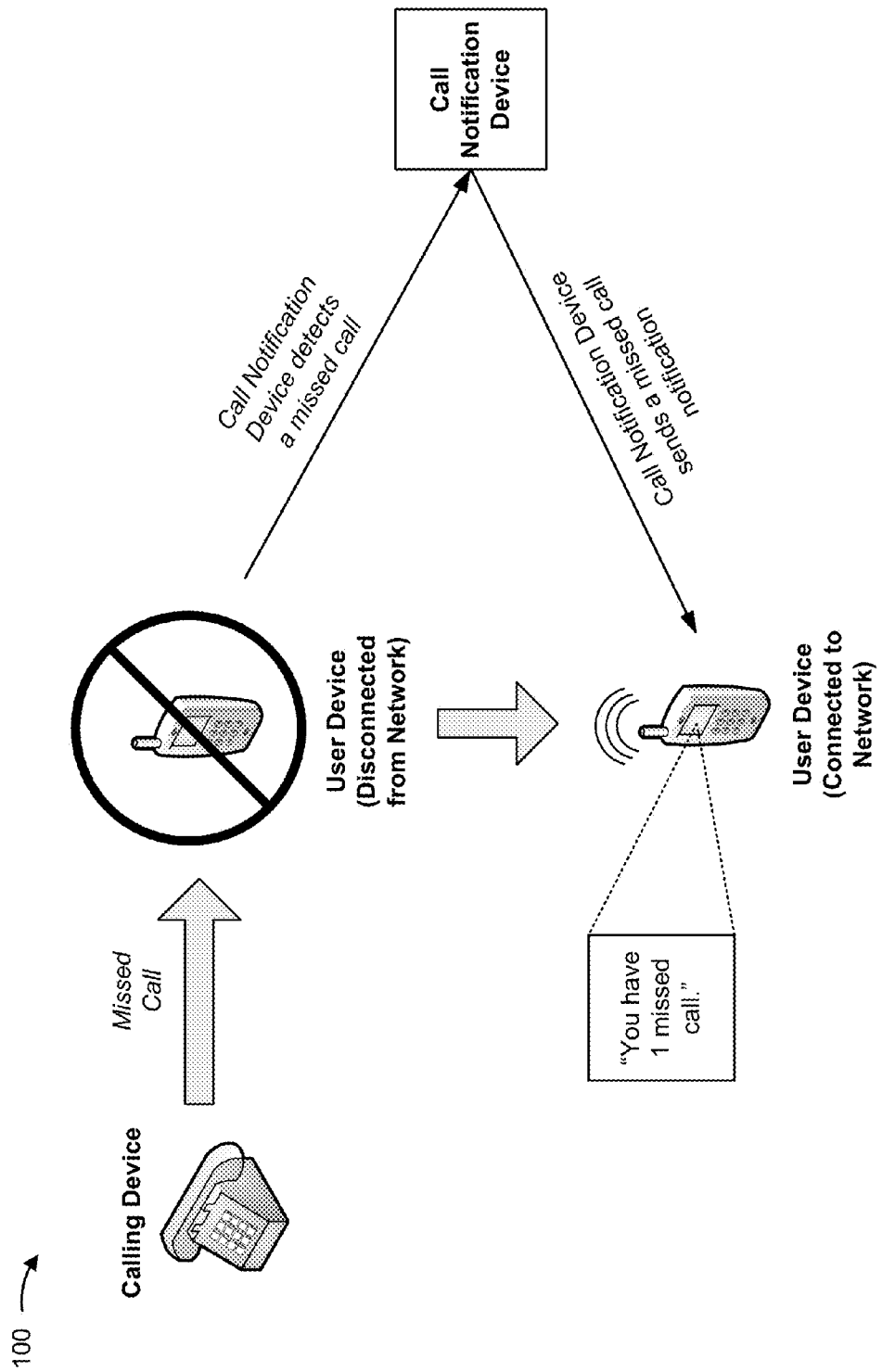
FIG. 1 is a diagram of an overview of an example implementation described herein.

FIG. 1 is a diagram of an example implementation 100 described herein. As shown in FIG. 1, example implementation 100 may include a calling device, a user device, and a call notification device.

As shown in FIG. 1, the calling device may attempt to connect to the user device via a telephone call. The user device may be disconnected from a network (e.g., a cellular network, a communication network, the Internet, etc.). For example, the user device may be powered off, may be roaming, may be out of range of a network service area, etc. Because the user device is disconnected from the network, the user device may be unable to receive a notification that the user device missed the call (e.g., a missed call notification). The call notification device may detect that the user device missed the call (e.g., may detect that the calling device has attempted to connect to the user device while the user device is disconnected from the network).

As further shown in FIG. 1, at a later time, the user device may be connected to the network. For example, the user device may be powered on, may enter a network service area, etc. The call notification device may send a missed call notification to the user device. The missed call notification may include an indication that the user device has missed the call. The missed call notification may be displayed on a display associated with the user device. In this way, a user may be notified of calls sent to the user device while the user device is disconnected from the network.

Figure 2:
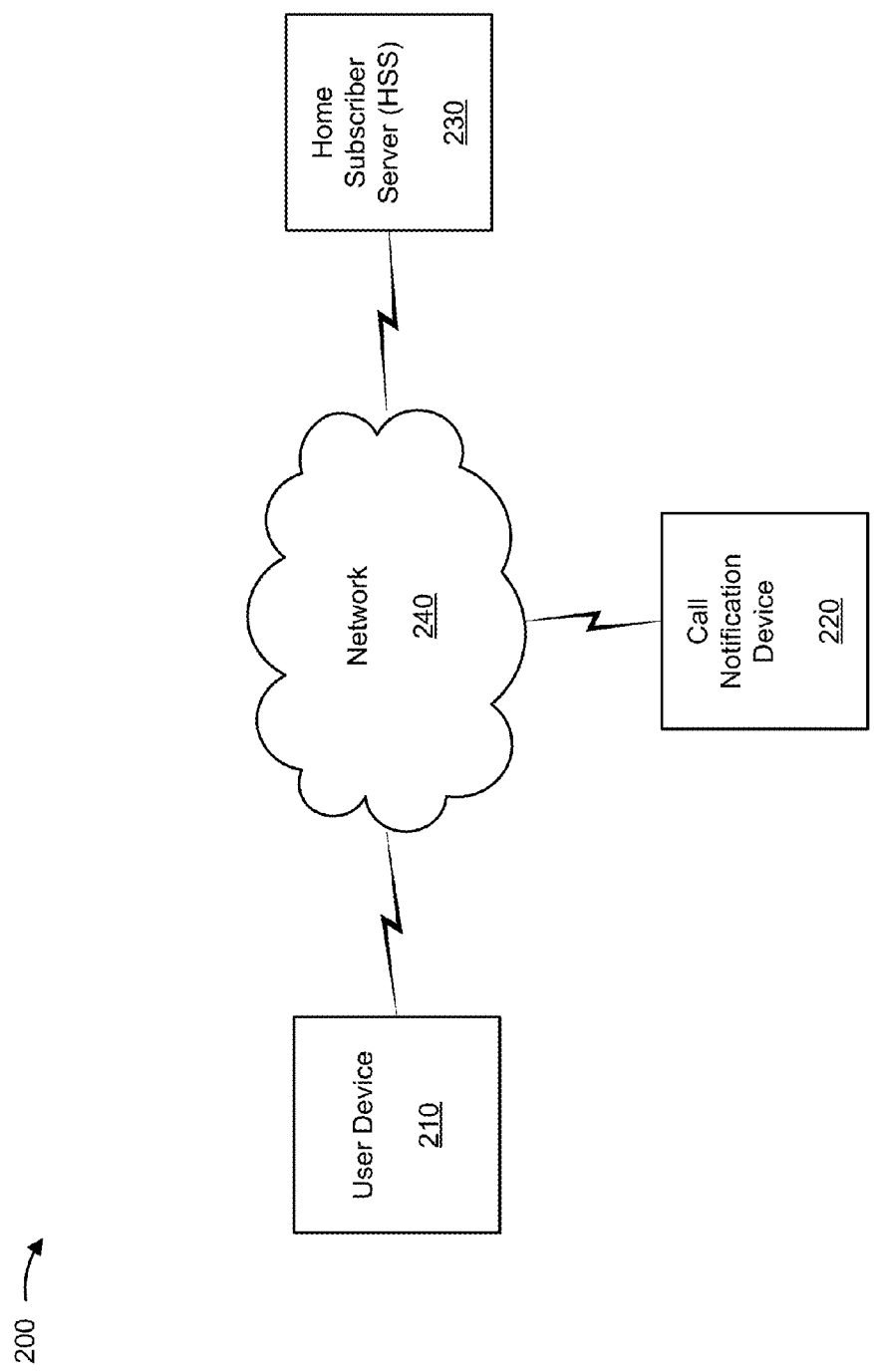
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a call notification device 220, a home subscriber server (HSS) 230, and a network 240. Devices of environment 200 may interconnect via wired connections, wireless connections, or a combination of wired and wireless connections.

User device 210 may include a device capable of making and/or receiving calls (e.g., voice and/or video calls). For example, user device 210 may include a mobile phone (e.g., a smart phone, a radiotelephone, etc.), a landline telephone (e.g., a payphone, a home telephone, etc.), a computing device (e.g., a desktop computer, a laptop computer, a tablet computer, a handheld computer, etc.), or a similar device. In some implementations, user device 210 may include a display that outputs information from user device 210 and/or that allows a user to provide input to user device 210. Additionally, or alternatively, user device 210 may receive information from and/or transmit information to call notification device 220 and/or HSS 230 (e.g., information associated with a missed call). User device 210 may be associated with a user.

Call notification device 220 may include a device capable of detecting a missed call and/or providing a missed call notification. For example, call notification device 220 may include a server, a network device (e.g., a switch, a router, a gateway, a hub, a bridge, an optical add-drop multiplexer ("OADM"), a base station, a network interface card ("NIC"), etc.) a computing device (e.g., a desktop computer, a laptop computer, a tablet computer, a handheld computer, etc.), a telephony application server ("TAS"), or a similar device. In some implementations, call notification device 220 may transmit information to and/or receive information from user device 210 and/or HSS 230 (e.g., information associated with a missed call).

HSS 230 may include one or more computation or communication devices, such as a server device. For example, HSS 230 may receive, store, and/or provide subscription-related information (e.g., subscriber profiles) associated with user device 210, and/or location-related information associated with user device 210 (e.g., user device 210 location, network address, etc.), and/or may perform authentication and authorization of user device 210. HSS 230 may monitor whether user device 210 is connected to a network (e.g., network 240) and/or available, and may provide such information to call notification device 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
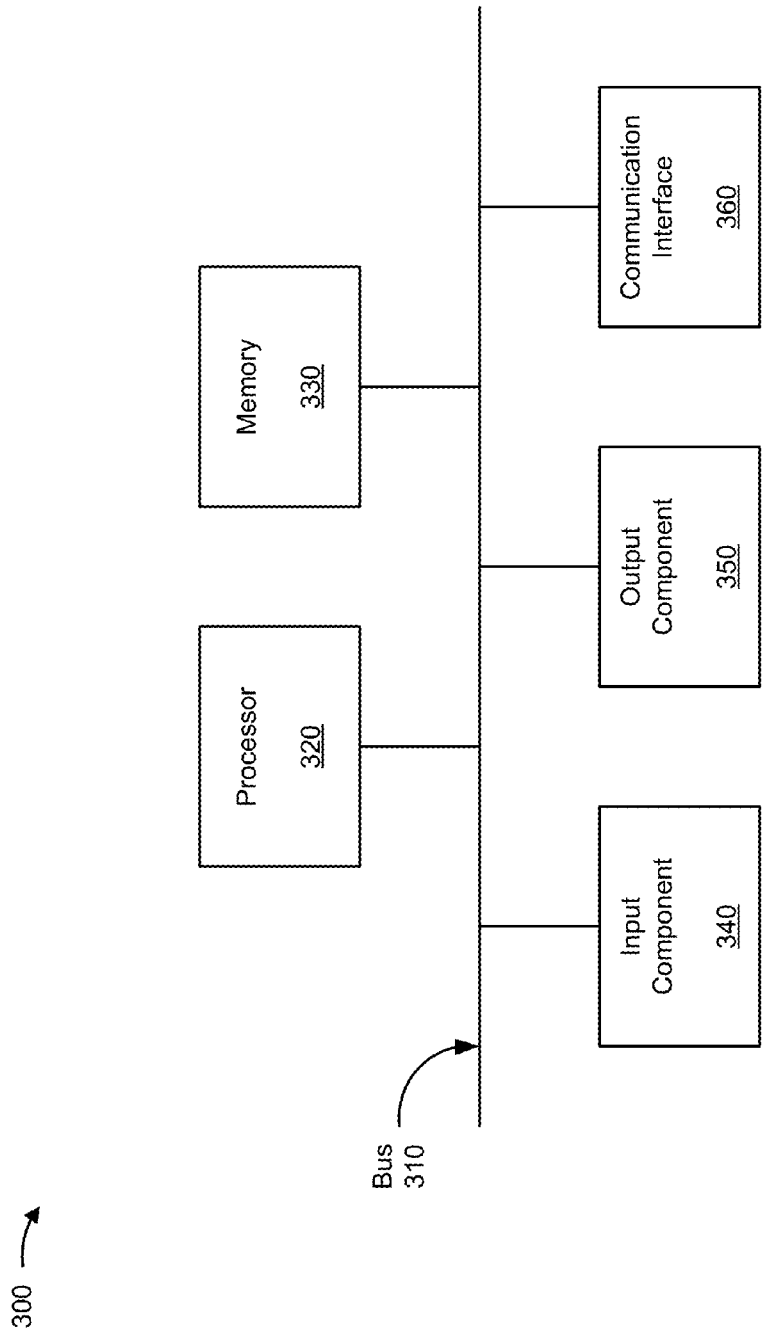
FIG. 3 is a diagram of example components of one or more devices of FIG. 2.

FIG. 3 is a diagram of example components of a device 300. Device 300 may correspond to user device 210, call notification device 220, and/or HSS 230. Additionally, or alternatively, each of user device 210, call notification device 220, and/or HSS 230 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
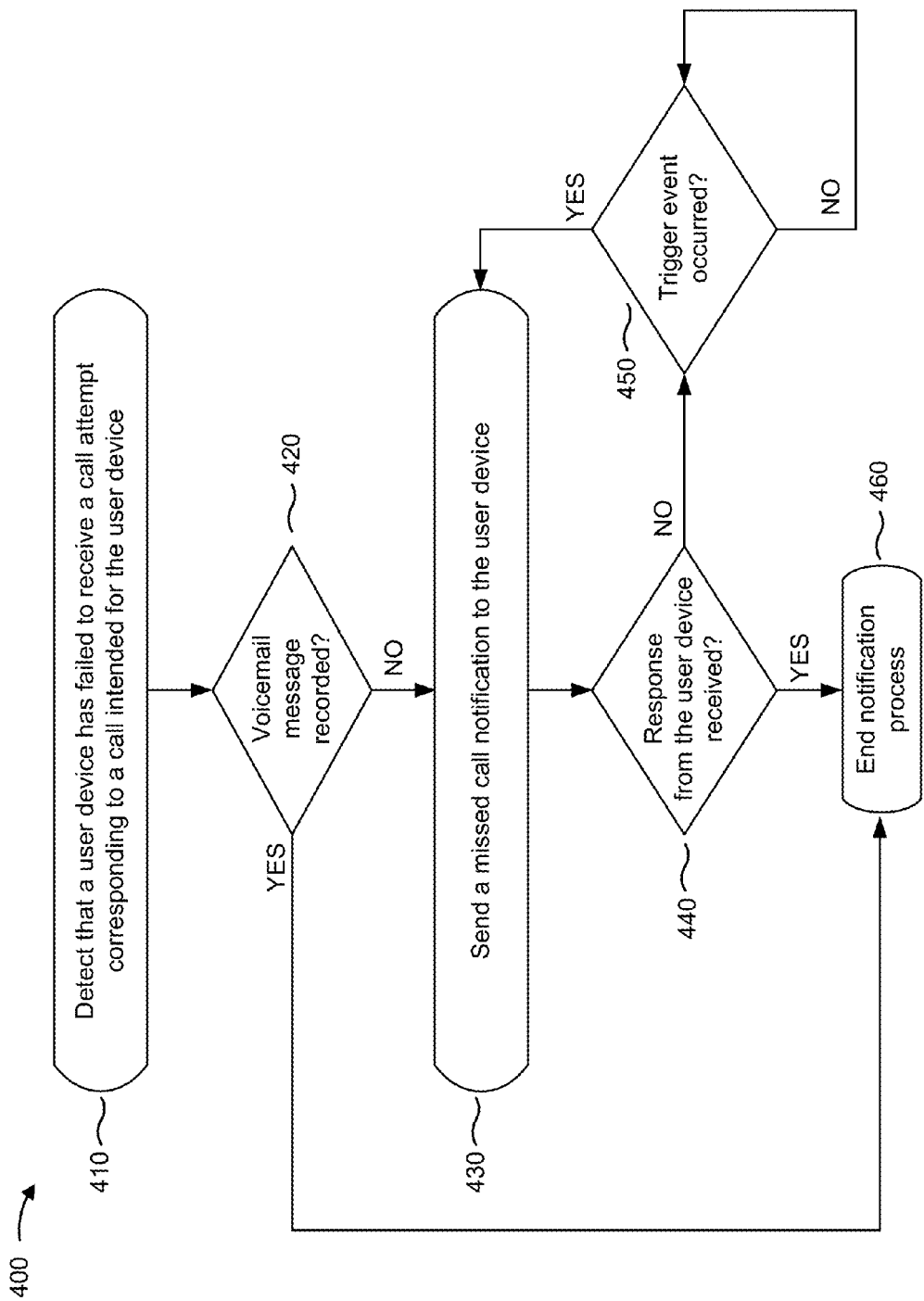
FIG. 4 is a flow chart of an example process for notifying a user device of a missed call.

FIG. 4 is a flow chart of an example process 400 for notifying a user device of a missed call. In some implementations, one or more process blocks of FIG. 4 may be performed by call notification device 220. Additionally, or alternatively, one or more process blocks of FIG. 4 may be performed by another device or group of devices separate from or including call notification device 220, such as HSS 230.

As shown in FIG. 4, process 400 may include detecting that a user device has failed to receive a call attempt corresponding to a call intended for the user device (block 410). For example, call notification device 220 may detect that user device 210 has been called by a calling device (e.g., a calling cell phone, a calling landline phone, etc.) and has failed to receive the call attempt from the calling device. In some implementations, user device 210 may fail to receive the call attempt from the calling device because user device 210 is disconnected from the network (e.g., network 240). For example, user device 210 may be disconnected from the network due to being powered off, deactivated, without a subscription, roaming, outside of a service area, in airplane mode, without cellular coverage, etc. Additionally, or alternatively, user device 210 may be disconnected from a particular type of network, such as a fourth generation (4G) network, a long term evolution (LTE) network, a code division multiple access (CDMA) network, etc.

In some implementations, call notification device 220 may detect that a calling device is attempting to connect to user device 210. For example, call notification device 220 may detect that the calling device has placed a call (e.g., a telephone call, a voice over internet (VOIP) call, etc.) to user device 210. Call notification device 220 may send an invitation message to user device 210 inviting user device 210 to connect on the call. Call notification device 220 may determine that user device 210 has failed to receive the call attempt from the calling device by determining that user device 210 has failed to respond to the invitation message.

In some implementations, call notification device 220 may determine that user device 210 has failed to respond to the invitation message within a particular time period. For example, call notification device 220 may send the invitation message to user device 210 and may wait an amount of time (e.g., forty-five seconds). If no response is received from user device 210 (e.g., the user of user device 210 fails to answer the phone) after the amount of time (e.g., after forty-five seconds), call notification device 220 may determine that user device 210 has missed the call (e.g., has failed to receive the call attempt). Additionally, or alternatively, call notification device 220 may detect the missed call by determining that user device 210 has failed to connect on the call after a particular quantity of phone rings.

In some implementations, call notification device 220 may detect the missed call by use of session initiation protocol (SIP). SIP may be used to create, modify, and/or terminate two-party and/or multiparty communication sessions (e.g., telephone calls, videoconferencing, multimedia streaming, instant messaging, etc.) over a network. For example, call notification device 220 may detect that the calling device is attempting to connect with user device 210, and may send a SIP request (e.g., a SIP INVITE request) to initiate a communication session. Call notification device 220 may determine that user device 210 can connect to the calling device by receiving an acknowledgement of the SIP request (e.g., by receiving a SIP acknowledgement, such as a SIP ACK request), or may determine that used device 210 has failed to receive the call attempt by detecting a failure, by user device 210, to respond to the SIP request (e.g., within a period of time). Additionally, or alternatively, call notification device 220 may use SIP to send SIP requests, such as mid-session information (e.g., a SIP INFO request), an instant message (e.g., a SIP MESSAGE request), or the like.

As further shown in FIG. 4, process 400 may include determining whether a voicemail message has been recorded (block 420). For example, call notification device 220 may determine whether a voicemail message, associated with the call, has been recorded. In some implementations, call notification device 220 may receive an indication (e.g., from another device, such as HSS 230, a voicemail server, etc.) that a calling user of the calling device has left a voicemail message, associated with the call, for the user of user device 210.

In some implementations, call notification device 220 may wait for a particular amount of time to determine whether the voicemail message has been recorded. For example, the voicemail message may be limited to a particular length of time (e.g., one minute), and call notification device 220 may wait for approximately the particular length of time (e.g., one minute, two minutes, etc.) and/or an amount of time based on the particular length of time, to determine whether the voicemail message has been recorded.

Additionally, or alternatively, call notification device 220 may determine that user device 210 was connected to the network when the call was missed (e.g., that the missed call was recorded by user device 210), and/or that user device 210 has received a missed call notification associated with the missed call.

As further shown in FIG. 4, if a voicemail message has not been recorded (block 420—NO), then process 400 may include sending a missed call notification to the user device (block 430). For example, call notification device 220 may send the missed call notification to user device 210. The missed call notification may include a message indicating that user device 210 has missed a call.

In some implementations, call notification device 220 may use a SIP request to send the missed call notification. For example, call notification device 220 may send a SIP request (e.g., a SIP NOTIFY request) to user device 210. The SIP request may inform user device 210 about the missed call. In some implementations, user device 210 may subscribe to receive missed call notifications, from call notification device 220, using a SIP SUBSCRIBE request. Call notification device 220 may send a missed call notification to user device 210 using a SIP NOTIFY request, based on user device 210 being subscribed to receive the missed call notification.

In some implementations, the missed call notification may include a notification for display on user device 210. For example, the missed call notification may include a message to be displayed (e.g., on the display of user device 210), such as a text message, a picture, a diagram, an icon, or the like. Additionally, or alternatively, the missed call notification may include an audible message, such as an audio recording, a tone, an audio alert, or the like.

In some implementations, the missed call notification may provide a user (e.g., a user of user device 210) options based on the missed call notification. For example, the missed call notification may provide the user an option to connect with the calling device, an option to send the calling device a message (e.g., a text message), an option to record a voicemail message for the calling device, or the like. Call notification device 220 may receive the user's selection (e.g., the information input into user device 210), and may carry out the user's selection (e.g., may connect the user device to the calling device, may send the calling device a text message, may leave a voicemail message for the calling device, etc.).

In some implementations, the missed call notification may include missed call information. The missed call information may include information associated with the call, such as a call date, a call time, a phone number associated with the calling device, an identification number associated with the calling device, or the like. Additionally, or alternatively, missed call information may include information identifying the caller (e.g., the caller's name), information identifying the calling device (e.g., a cell phone model, a communication device type, etc.), or the like. In some implementations, call notification device 220 may store missed call information. For example, call notification device 220 may detect a missed call, and may store information about the missed call (e.g., a call time, a caller phone number, etc.). Additionally, or alternatively, call notification device 220 may receive missed call information from another device, such as HSS 230.

As further shown in FIG. 4, process 400 may include determining whether a response from the user device has been received (block 440). For example, call notification device 220 may send the missed call notification to user device 210, and may determine whether a response to the missed call notification, from user device 210, has been received by call notification device 220. In some implementations, the response may include a SIP response (e.g., a SIP acknowledgment). Additionally, or alternatively, the response may include a text message, a packet (e.g., an ACK packet), a signal, or the like.

In some implementations, the response may include an acknowledgment that user device 210 has received the missed call notification. For example, the response may indicate that user device 210 has been powered on and/or that user device 210 is connected to the network (e.g., a service provider account associated with user device 210 has been activated). In some implementations, the response may include information input by a user (e.g., a user of user device 210). The user input information may indicate whether user device 210 is to connect to the calling device, send a text message to the calling device, leave a voicemail message for the calling device, or the like.

As further shown in FIG. 4, if a response has not been received from the user device (block 440—NO), then process 400 may include determining whether a trigger event has occurred (block 450). If the trigger event has not occurred (block 450—NO), then process 400 may include returning to block 450 and waiting until the trigger event has occurred. If the trigger event has occurred (block 450—YES), then process 400 may include returning to block 430 to send an additional missed call notification. For example, call notification device 220 may determine that a response has not been received from user device 210, and may send an additional missed call notification, to user device 210, based on detecting that a trigger event has occurred.

In some implementations, detecting that the trigger event has occurred may include detecting a passing of a particular amount of time without receiving a response from user device 210. For example, call notification device 220 may detect a lapse in time after a missed call notification was transmitted (e.g., a first missed call notification, a second missed call notification, etc.). Based on detecting the lapse of time, call notification device 220 may send a first missed call notification to user device 210. Call notification device 220 may detect an additional lapse in time after sending the first missed call notification, and may send a second missed call notification to user device 210. Call notification device 220 may detect an additional lapse in time, and may send a third missed call notification. In some implementations, call notification device 220 may continue to send missed call notifications, to user device 210, until a response is received from user device 210. Additionally, or alternatively, call notification device 220 may stop sending missed call notifications after a threshold quantity of missed call notifications have been sent (e.g., after twenty missed call notifications, after fifty missed call notifications, etc.).

In some implementations, the amount of time may be based on a regular time interval. For example, call notification device 220 may send missed call notifications at regular intervals (e.g., every twenty minutes, every hour, etc.). Additionally, or alternatively, the time duration may be based on intervals that increase or decrease over time. For example, call notification device 220 may send missed call notifications at increasing intervals (e.g., at 10 minutes after the first missed call notification, 20 minutes after the second missed call notification, 40 minutes after the third missed call notification, 80 minutes after the fourth missed call notification, etc.). In some implementations, the time interval may increase or decrease linearly. Additionally, or alternatively, the time interval may increase or decrease exponentially.

In some implementations, detecting that the trigger event has occurred may include detecting that user device 210 is connected to the network. For example, call notification device 220 may send a missed call notification to user device 210, and may fail to receive a response from user device 210. Call notification device 220 may wait until user device 210 is connected to the network before sending an additional missed call notification. For example, user device 210 may connect to the network by powering on, activating an account, entering a service area, exiting airplane mode, etc. In some implementations, call notification device 220 may detect that user device 210 is connected to the network. Additionally, or alternatively, call notification device 220 may receive a notification, from user device 210 and/or HSS 230, that user device 210 is connected to the network.

In some implementations, detecting that the trigger event has occurred may include detecting that a user-specified trigger event has occurred. For example, a user of user device 210 may input, via user device 210, the time interval between the missed call notifications, and/or whether to wait until the user device is reconnected to the network before sending a missed call notification. Additionally, or alternatively, the user may determine whether call notification device 220 is to send a missed call notification when a caller of a calling device has left a voicemail message. In some implementations, the user may set these preferences, and user device 210 may transmit the preferences for storage on call notification device 220 and/or HSS 230. Call notification device 220 may determine whether a trigger event, specified by the user, has occurred.

As further shown in FIG. 4, if a response has been received from the user device (block 440—YES), or a voicemail message has been recorded (block 420—YES), then process 400 may include ending the notification process (block 460). For example, call notification device 220 may receive a response from user device 210 indicating that the missed call notification has been received by user device 210. Based on the response, call notification device 220 may stop sending missed call notifications. Additionally, or alternatively, call notification device 220 may receive (e.g., from HSS 230, a voicemail server, etc.) an indication that a voicemail message, associated with the call, has been recorded. Based on the indication, call notification device 220 may end the notification process.

While a series of blocks has been described with regard to FIG. 4, the blocks and/or the order of the blocks may be modified in some implementations. Additionally, or alternatively, non-dependent blocks may be performed in parallel.

Figure 5B:
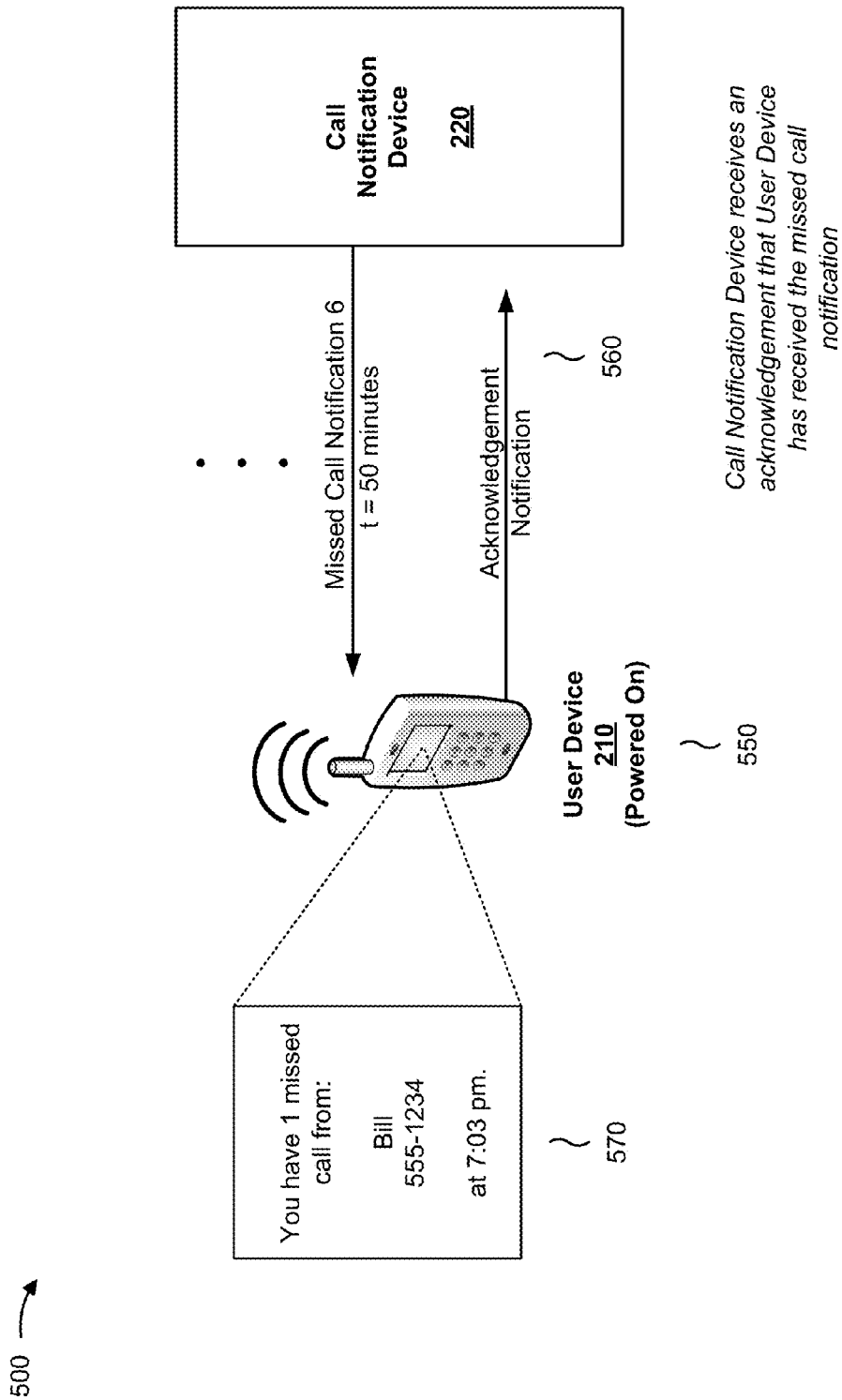

FIGS. 5A and 5B are diagrams of an example implementation 500 relating to process 400 shown in FIG. 4. In example implementation 500, call notification device 220 may detect a missed call, and may send a series of missed call notifications to user device 210 until a response is received from user device 210.

As shown in FIG. 5A, call notification device 220 may detect a missed call, and may send a series of missed call notifications to user device 210. As shown by reference number 510, a calling device may attempt to connect with user device 210 via a telephone call. The calling device may be unable to connect to user device 210 because user device 210 is powered off, as shown by reference number 520. Because user device 210 is powered off, user device 210 may be unable to receive a missed call notification indicating that the calling device has attempted to connect. A caller using the calling device may not record a voicemail message for user device 210.

As shown by reference number 530, call notification device 220 may detect the missed call. In some implementations, call notification device 220 may detect that the call placed by the calling device was not answered by user device 210 within a particular period of time. Additionally, or alternatively, call notification device 220 may detect that the call was not answered by user device 210 after a particular quantity of phone rings.

As shown by reference number 540, call notification device 220, based on detecting the missed call and detecting that a voicemail message was not received, may send a series of missed call notifications to user device 210. In some implementations, the missed call notifications may include missed call information, such as the time of the missed call, the name of a caller associated with the calling device, the phone number associated with the calling device, or the like. Additionally, or alternatively, the missed call notification may include an indication that the calling device attempted to connect while user device 210 was powered off.

In some implementations, call notification device 220 may send a series of missed call notifications at fixed time intervals. For example, call notification device 220 may send a first missed call notification (e.g., "Missed Call Notification 1") upon detecting the missed call (e.g., at "t=0 minutes"). Call notification device 220 may wait for a fixed time interval (e.g., ten minutes) and may send a second missed call notification (e.g., "Missed Call Notification 2") at the end of the time interval (e.g., at "t=10 minutes"). Call notification device 220 may wait for the fixed time interval, and may send a third missed call notification (e.g., "Missed Call Notification 3") at the end of the time interval (e.g., at "t=20 minutes"). In this manner, call notification device 220 may continue to send missed call notifications at fixed time intervals (e.g., every ten minutes) until receiving a response from user device 210. Additionally, or alternatively, the time intervals may increase or decrease with each successive missed call notification.

As shown in FIG. 5B, and by reference number 550, user device 210 may be powered on and may connect to the network.

As shown by reference number 560, call notification device 220 may send a sixth missed call notification (e.g., "Missed Call Notification 6"), to user device 210, at a fixed time interval (e.g., "t=50 minutes") after detecting the missed call. User device 210 may receive the sixth missed call notification because user device 210 has been powered on. After sending the sixth missed call notification, call notification device 220 may receive an acknowledgment notification from user device 210. The acknowledgement notification may indicate that user device 210 has received the sixth missed call notification.

As shown by reference number 570, the sixth missed call notification may include missed call information to be displayed on a display associated with user device 210. For example, the missed call information may be displayed on a screen associated with user device 210. The missed call information may include a message indicating that there is a missed call (e.g., "You have 1 missed call"). The missed call information may identify a user associated with the calling device (e.g., "Bill"), and/or may identify a phone number associated with the calling device (e.g., "555-1234"). Additionally, or alternatively, the missed call information may identify a time associated with the missed call (e.g., "7:03 pm").

Figure 6:
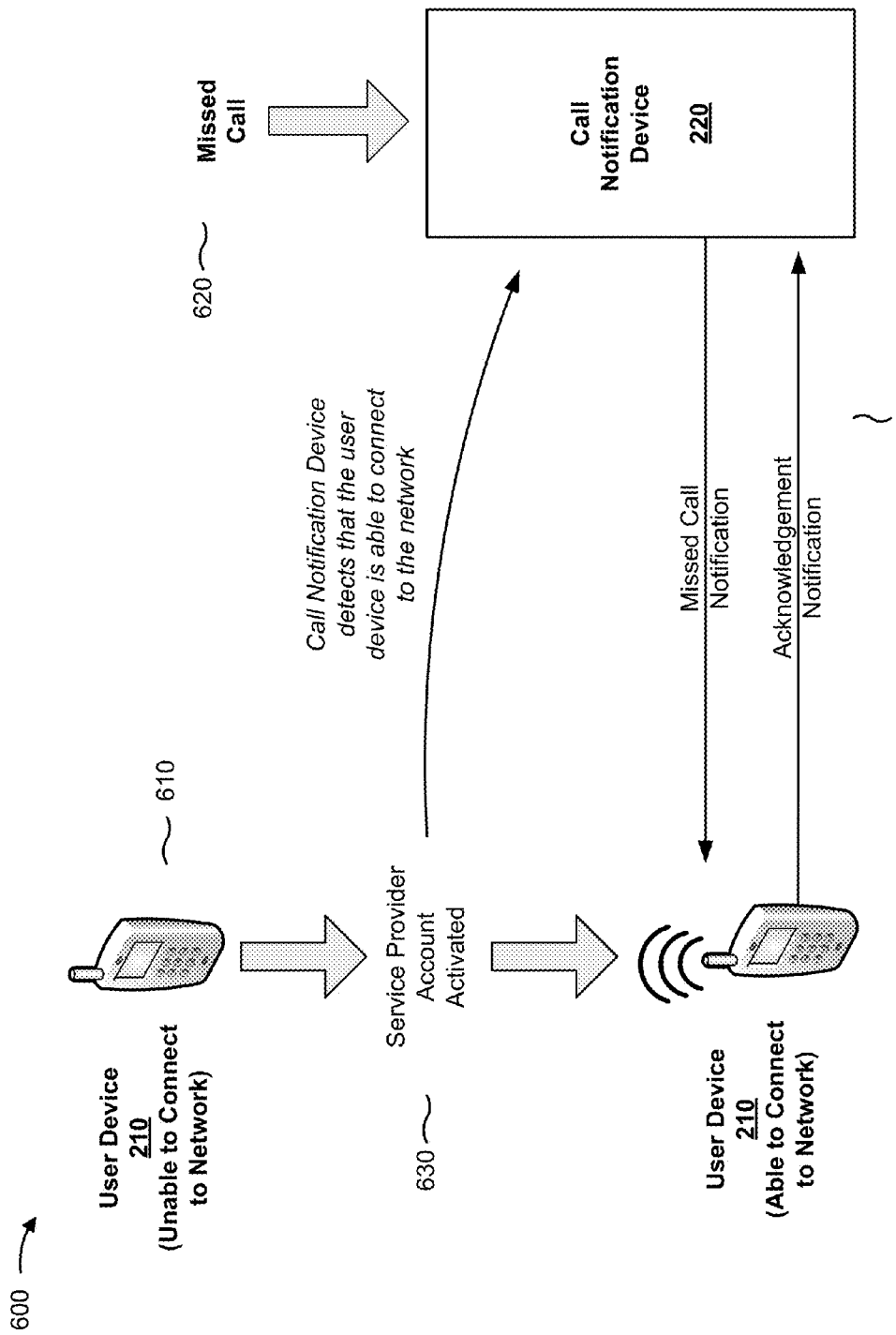
FIG. 6 is a diagram of another example implementation relating to the example process shown in FIG. 4.

FIG. 6 is a diagram of an example implementation 600 relating to process 400 shown in FIG. 4. In example implementation 600, call notification device 220 may send a missed call notification based on determining that user device 210 is connected to the network.

As shown by reference number 610, user device 210 may be disconnected from the network when a service provider account associated with user device 210 is deactivated (e.g., temporarily deactivated, inactive, etc.). For example, the account may be deactivated when a user fails to pay an account bill. In some implementations, user device 210 may include a cell phone, and the service provider may include a wireless service provider. Additionally, or alternatively, user device 210 may include a computer, and the service provider may include an internet service provider (ISP).

As shown by reference number 620, call notification device 220 may determine that user device 210 has missed a call (e.g., that a calling device attempted to connect to user device 210 while user device 210 was disconnected from the network). For example, call notification device 220 may receive an indication of a missed call. Call notification device 220 may further determine that the calling device has failed to record a voicemail message associated with the missed call. In some implementations, call notification device 220 may receive missed call information. The missed call information may identify a caller associated with a calling device, a phone number identifying the calling device, or the like.

As shown by reference number 630, the service provider account associated with user device 210 may be activated by the service provider. In some implementations, the user account may be activated when the user has paid all bills associated with the account. When the service provider account is activated, user device 210 may connect to the network. In some implementations, call notification device 220 may detect that user device 210 is connected to the network. For example, call notification device 220 may receive an indication from user device 210 that user device 210 is connected to the network. Additionally, or alternatively, call notification device 220 may receive the indication from another device, such as HSS 230.

As shown by reference number 640, call notification device 220 may send a missed call notification to user device 210. For example, call notification device 220 may send the missed call notification based on detecting that user device 210 is connected to the network and that the calling device has failed to record a voicemail message. Call notification device 220 may receive an acknowledgment notification indicating that the missed call notification has been received by user device 210. After receiving the acknowledgment notification, call notification device 220 may stop the process of notification (e.g., may stop sending missed call notifications to user device 210).

Implementations described herein may allow a user device to receive a missed call notification associated with a call missed by the user device because the user device is disconnected from the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
one or more processors to:

detect that a user device has failed to receive a call attempt for a call intended for the user device and from a calling party while a service provider account associated with the user device is deactivated;

send a request to a voicemail device based on detecting that the user device failed to receive the call attempt;

receive a response from the voicemail device indicating whether the calling party has left a voicemail message associated with the call attempt that the user device failed to receive;

determine, based on the response from the voicemail device, whether the calling party has left a voicemail message associated with the call;

when the calling party is determined not to have left the voicemail message, store missed call information based on determining that the calling party has not left the voicemail message, the missed call information including information associated with the call attempt detected while the service provider account is deactivated;

when the calling party is determined not to have left the voicemail message, detect that the service provider account associated with the user device has been activated;

when the calling party is determined not to have left the voicemail message, send a first missed call notification to the user device, based on determining that the calling party has not left the voicemail message and based on detecting the service provider account has been activated, the first missed call notification including the missed call information;

when the calling party is determined not to have left the voicemail message, detect that the user device has not received the first missed call notification;

when the calling party is determined not to have left the voicemail message, send a second missed call notification to the user device, based on detecting that the user device has not received the first missed call notification, the second missed call notification including the missed call information; and when the calling party is determined to have left the voicemail message, end a notification process without sending the first missed call notification to the user device.

2. The device of claim 1, where the one or more processors, when detecting whether the user device has failed to receive the call attempt, are to:

detect that a calling device, associated with the calling party, is attempting to connect to the user device; and determine that the calling device has not connected to the user device within a particular amount of time.

3. The device of claim 1, where the missed call information identifies at least one of:

a date associated with the call;
a time associated with the call;
a telephone number associated with the call;
a name associated with the call;
the calling party associated with the call;
a calling device associated with the call; or
information indicating that the user device was not connected to a network when the call was attempted.

4. The device of claim 1, where the one or more processors, when detecting that the user device has not received the first missed call notification, are to at least one of:

detect a lapse in time without receiving a response from the user device;
detect that the user device is not connected to a network;
detect that the user device is outside a range of the network; or
detect that the service provider account associated with the user device is deactivated.

5. The device of claim 1, where the one or more processors, when detecting that the user device has not received the first missed call notification, are to detect a lapse in time; and where the one or more processors, when sending the second missed call notification, are to:

send the second missed call notification based on:
an interval of time that is fixed for a plurality of missed call notifications;
an interval of time that linearly increases for a plurality of missed call notifications;
an interval of time that linearly decreases for a plurality of missed call notifications;
an interval of time that exponentially increases for a plurality of missed call notifications; or
an interval of time that exponentially decreases for a plurality of missed call notifications.

6. The device of claim 1, where the one or more processors are further to:

receive an acknowledgement from the user device,
the acknowledgement indicating that the second missed call notification has been received by the user device; and stop sending missed call notifications based on receiving the acknowledgment.

7. A non-transitory computer-readable medium storing instructions, the instructions comprising:

one or more instructions that, when executed by a processor, cause the processor to:

detect that a user device has missed a call from a calling party while a service provider account associated with the user device is deactivated,
the user device being disconnected from a network and being unable to receive the call;

send a request to a voicemail device based on detecting that the user device missed the call;

receive a response from the voicemail device indicating whether the calling party has left a voicemail message associated with the call;

determine that the calling party did not leave the voicemail message for the user device when the response from the voicemail device indicates that the calling party has not left the voicemail message;

detect that the service provider account associated with the user device has been activated;

send a first missed call notification to the user device, based on determining that the calling party did not leave the voicemail message and detecting that the service provider account has been activated,
the first missed call notification including missed call information associated with the call detected while the service provider account was deactivated;

detect that the user device has not received the first missed call notification;

send, based on detecting that the user device has not received the first missed call notification, a series of missed call notifications,
each missed call notification, in the series of missed call notifications, being sent based on detecting that a particular amount of time has passed since the first missed call notification or a missed call notification in the series was sent,
each missed call notification, in the series of missed call notifications, including the missed call information;
determine that the calling party did leave the voicemail message for the user device when the response from the voicemail device indicates that the calling party has left the voicemail message; and
end a notification process without sending the first missed call notification to the user device based on determining that the calling party did leave the voicemail message.

8. The non-transitory computer-readable medium of claim 7, where the one or more instructions, that cause the processor to detect that the user device has missed the call, cause the processor to:
detect that a calling device is attempting to connect on the call with the user device; and
determine that the user device has not answered the call.

9. The non-transitory computer-readable medium of claim 7, where the missed call information identifies at least one of:
a date associated with the call;
a time associated with the call;
a telephone number associated with the call;
a name associated with the call;
the calling party associated with the call;
a calling device associated with the call; or
information indicating that the user device was not connected to a network when the call was missed.

10. The non-transitory computer-readable medium of claim 7, where the one or more instructions, that cause the processor to detect that the user device has not received the missed call notification, cause the processor to at least one of:
detect that a particular amount of time has passed since the first missed call notification was sent; or
detect that the user device is not connected to the network.

11. The non-transitory computer-readable medium of claim 7, where the one or more instructions, that cause the processor to send the series of missed call notifications, cause the processor to:
send the series of missed call notifications based on at least one of:
an interval of time that is fixed for the series of missed call notifications;
an interval of time that linearly increases for the series of missed call notifications;
an interval of time that linearly decreases for the series of missed call notifications;
an interval of time that exponentially increases for the series of missed call notifications; or
an interval of time that exponentially decreases for the series of missed call notifications.

12. The non-transitory computer-readable medium of claim 7, where the one or more instructions, when executed by the processor, further cause the processor to:
receive an acknowledgement from the user device,
the acknowledgement indicating that a missed call notification, in the series of missed call notifications, has been received by the user device; and
stop sending missed call notifications based on receiving the acknowledgment.

13. A method, comprising:
detecting, by a device, that a user device has missed a call while a service provider account associated with the user device is deactivated;
sending, by the device, a request to a voicemail device based on detecting that the user device missed the call;
receiving, by the device, a response from the voicemail device indicating whether a calling party has left a voicemail message associated with the call;
detecting, by the device, that the voicemail message, associated with the call, has not been recorded when the response from the voicemail device indicates that the calling party has not left the voicemail message;
determining, by the device, that the user device is not connected to a network associated with the call based on the service provider account associated with the user device being deactivated;
determining, by the device, after determining that the user device is not connected to the network, that the user device is connected to the network based on the service provider account associated with the user device being activated;
transmitting, by the device, a missed call notification to the user device based on the service provider account associated with the user device being activated and based on detecting that the voicemail message has not been recorded,
the missed call notification including missed call information associated with the call detected while the service provider account was deactivated;
detecting, by the device, that the voicemail message, associated with the call, has been recorded when the response from the voicemail device indicates that the calling party has left the voicemail message; and
ending, by the device, a notification process without sending the missed call notification to the user device based on detecting that the voicemail message has been recorded.

14. The method of claim 13, where detecting that the user device has missed the call comprises:
detecting that a calling device is attempting to call the user device; and
determining that the calling device has not connected to the user device within a particular amount of time.

15. The method of claim 13, where the missed call information identifies at least one of:
a date associated with the call;
a time associated with the call;
a telephone number associated with the call;
a name associated with the call;
the calling party associated with the call;
a calling device associated with the call; or
information indicating that the user device was not connected to the network when the call was missed.

16. The method of claim 13, where determining that the user device is connected to the network comprises at least one of:
detecting that the user device is within a range of the network; or
receiving a notification from the user device,
the notification indicating that the user device is connected to the network.

17. The method of claim 13, where determining that the user device is not connected to the network comprises at least one of:
determining that the user device is not connected to a particular type of network; or
determining that the user device is not connected to a service provider network associated with the user device.

18. The non-transitory computer-readable medium of claim 7, where the series of missed call notifications includes a second missed called notification, and
  where the one or more instructions, when executed by the processor, further cause the processor to:
    resend the second missed call notification until the user device is detected to have received the second missed call notification; and
    stop resending the second missed call notification to the user device based on the second missed call notification being sent to the user device a threshold quantity of times without being received by the user device.

19. The method of claim 13, where transmitting the missed call notification to the user device, based on determining that the user device is connected to the network and based on detecting that the voicemail message has not been recorded, comprises:
  transmitting the missed call notification to the user device before determining that the user device is not connected to the network;
  waiting for the user device to connect to the network after determining that the user device is not connected to the network; and
  retransmitting the missed call notification to the user device based on determining that the user device is connected to the network.

20. The device of claim 1, where the one or more processors are further to:
  detect the service provider account is deactivated based on the service provider account being at least one of temporarily deactivated or inactive.

* * * * *